(12) United States Patent
He

(10) Patent No.: US 9,942,391 B2
(45) Date of Patent: Apr. 10, 2018

(54) CONFERENCE ACCESS METHOD AND APPARATUS

(71) Applicant: ZTE Corporation, Shenzhen (CN)

(72) Inventor: Qiuliang He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/442,456

(22) PCT Filed: Sep. 16, 2013

(86) PCT No.: PCT/CN2013/083582
§ 371 (c)(1),
(2) Date: May 13, 2015

(87) PCT Pub. No.: WO2014/075503
PCT Pub. Date: May 22, 2014

(65) Prior Publication Data
US 2016/0255191 A1    Sep. 1, 2016

(30) Foreign Application Priority Data

Nov. 14, 2012 (CN) .......................... 2012 1 0457395

(51) Int. Cl.
H04M 3/42 (2006.01)
H04M 3/56 (2006.01)
H04M 3/20 (2006.01)

(52) U.S. Cl.
CPC ......... H04M 3/42102 (2013.01); H04M 3/20 (2013.01); H04M 3/56 (2013.01);
(Continued)

(58) Field of Classification Search
CPC . H04M 3/56; H04M 3/42059; H04M 3/42034
(Continued)

(56) References Cited

U.S. PATENT DOCUMENTS 6,427,008 B1 * 7/2002 Balaz ................... H04M 15/00
379/114.1
2008/0037748 A1    2/2008 Jefferson et al.
(Continued)

FOREIGN PATENT DOCUMENTS

CN    1735190 A    2/2006
CN    1756343 A    4/2006
(Continued)

OTHER PUBLICATIONS

International Search Report for corresponding application PCT/CN2013/083582 filed Sep. 16, 2013; dated Dec. 12, 2013.
(Continued)

Primary Examiner — Thjuan K Addy
(74) Attorney, Agent, or Firm — Cantor Colburn LLP

(57) ABSTRACT

Provided are a conference access method and a conference access apparatus. The method includes: receiving a call from a calling user, wherein information of a number called by the calling user includes a number of a called user and a number prefix, the called user is a conference member of a conference room, and the number prefix is used for accessing a conference system; and accessing the calling user to the conference room of the conference system. Through the technical solution, the problem that the calling user cannot join the conference due to various reasons in the related arts is solved, the flow of accessing the calling user to the conference room is optimized, the scope of application of the conference access method is expanded, and the efficiency and the success rate of accessing the calling user to the conference room are increased.

14 Claims, 5 Drawing Sheets

(52) U.S. Cl.
CPC .... *H04M 3/563* (2013.01); *H04M 2203/5009* (2013.01); *H04M 2203/5054* (2013.01)

(58) Field of Classification Search
USPC ............ 379/204.01, 202.01, 201.01, 207.11, 379/207.13, 207.15
See application file for complete search history.

(56) References Cited

U.S. PATENT DOCUMENTS

2010/0189244 A1* 7/2010 Sastry ..................... H04M 3/56
379/202.01
2011/0274264 A1* 11/2011 Zhang ............... H04M 3/42314
379/243

FOREIGN PATENT DOCUMENTS

| CN | 101374175 A | 2/2009 |
| CN | 101388787 A | 3/2009 |
| EP | 1081932 A2 | 3/2001 |
| EP | 1309164 A2 | 5/2003 |
| EP | 2040494 A1 | 3/2009 |

OTHER PUBLICATIONS

Suplemental European Search Report Application No. EP13854301 dated Nov. 17, 2015; pp. 7.

* cited by examiner

CONFERENCE ACCESS METHOD AND APPARATUS

TECHNICAL FIELD

The disclosure relates to the field of communications, and more particularly to a conference access method and a conference access apparatus.

BACKGROUND

As a common communication means and an international popular office way, the teleconference is cost-saving, time-saving, highly real-time and not geographically restricted etc., thereby becoming an important means for the modern business, office and management.

In the technologies of the related art, generally, there are two ways for joining the conference call. In one way, a calling user initiatively dials a conference access number and selects a conference room through a voice menu; or directly dials a conference access number and the number of the conference room and enters a password to access the conference room. In the other way, a system calls conference members in an outbound way after it is time for a conference, and each conference member joins the conference after being connected.

However, in some cases, the calling user, who wants to join a conference after it is started, cannot join the conference any more when he/she cannot acquire the number of the conference room due to some reasons although he/she is indeed one of the planned members of this conference. For example, when being outside, he/she cannot acquire the number of the conference room nor asking a related conference member on the line for the number since the conference members are all engaged in the conference and cannot be reached. In some other cases, the calling user, who is not a planned member of a conference but wants to observe the conference temporarily, cannot observe the conference when he/she does not know the access number of the conference, the number of the conference room, the password and the like.

At present, there is still no effective solution to solve the problem that the calling user cannot join the conference due to various reasons in the related arts.

SUMMARY

To solve the problem that the calling user cannot join the conference due to various reasons in the related arts, the embodiments of the disclosure provide a conference access method and a conference access apparatus, in order to at least solve the problem.

In one aspect, an embodiment of the disclosure provides a conference access method, including that: a call from a calling user is received, wherein information of a number called by the calling user comprises a number of a called user and a number prefix, the called user is a conference member of a conference room, and the number prefix is used for accessing a conference system; and the calling user is accessed to the conference room of the conference system.

After the call from the calling user is received, the method may further include that: the calling user is subjected to identity authentication according to the information of the number called by the calling user.

That the calling user is subjected to identity authentication according to the information of the number called by the calling user includes that: whether the calling user is a conference member of the conference room where the number of the called user is in is determined according to the number of the called user; and when it is determined that the calling user is a conference member of the conference room where the number of the called user is in, the calling user is subjected to identity authentication.

That whether the calling user is a conference member of the conference room is determined according to the number of the called user includes that: whether the number of the called user is contained in information about online conference members is queried; when the number of the called user is contained in the information about the online conference members, a number of the conference room where the number of the called user is in is determined according to the number of the called user; information about conference members of the conference room is determined according to the number of the conference room; and whether the calling user is a conference member of the conference room is determined according to the information about the conference members of the conference room.

That the calling user is subjected to identity authentication includes that: the calling user is prompted to input a conference password; whether the conference password input by the calling user is correct is judged; and when the conference password input by the calling user is correct, it is determined that identity authentication for the calling user is successful.

After whether the calling user is a conference member of the conference room is determined, the method may further include that: when the calling user is not a conference member of the conference room, the calling user is taken as a conference observer of the conference room and is subjected to identity authentication.

That the calling user is taken as the conference observer of the conference room and is subjected to identity authentication includes that: the called user is queried about whether to permit the calling user to access the conference room; when the called user permits the calling user to access the conference room, a host of the conference room is queried about whether to permit the calling user to access the conference room; and when the host of the conference room permits the calling user to access the conference room, it is determined that identity authentication for the calling user is successful.

In another aspect, an embodiment of the disclosure provides a conference access apparatus, including: a call receiving component, which is configured to receive a call from a calling user, wherein information of a number called by the calling user comprises a number of a called user and a number prefix, the called user is a conference member of a conference room, and the number prefix is used for accessing a conference system; and a conference room access component, which is configured to access the calling user to the conference room of the conference system.

The apparatus may further include: an identity authentication component, which is configured to authenticate identity of the calling user according to the information of the number called by the calling user.

The identity authentication component includes: a determining unit, which is configured to determine, according to the number of the called user, whether the calling user is a conference member of the conference room where the number of the called user is in; and a first authentication unit, which is configured to authenticate identity of the calling user when the determining unit determines that the calling user is a conference member of the conference room where the number of the called user is in.

The determining unit includes: a query sub-unit, which is configured to query whether the number of the called user is contained in information about online conference members; a first determining sub-unit, which is configured to, when a query result of the query sub-unit is that the number of the called user is contained in information about online conference members, determine a number of the conference room where the number of the called user is in according to the number of the called user and determine information about conference members of the conference room according to the number of conference room; and a second determining sub-unit, which is configured to determine whether the calling user is a conference member of the conference room according to the information about the conference members of the conference room determined by the first determining sub-unit.

The first authentication unit includes: a password prompt sub-unit, which is configured to prompt the calling user to input a conference password; a password judgement sub-unit, which is configured to judge whether the conference password input by the calling user is correct; and a first authentication success sub-unit, which is configured to determine that identity authentication for the calling user is successful when a judgement result of the password judgement sub-unit is that the password input by the calling user is correct.

The identity authentication component may further include: a second authentication unit, which is configured to, when the determining unit determines that the calling user is not a conference member of the conference room, take the calling user as a conference observer of the conference room and authenticate the identity of the calling user.

The second authentication unit includes: a first query sub-unit, which is configured to query the called user about whether to permit the calling user to access the conference room; a second query sub-unit, which is configured to query a host of the conference room about whether to permit the calling user to access the conference room when a query result of the first query sub-unit is that the called user permits the calling user to access the conference room; and a second authentication success sub-unit, which is configured to determine that identity authentication for the calling user is successful when a query result of the second query sub-unit is that the host permits the calling user to access the conference room.

Through the embodiments of the disclosure, the calling user directly accesses the conference system through a number prefix called by the calling user and directly accesses the conference room by calling a conference member, so that the problem that the calling user cannot join the conference due to various reasons in the related arts is solved, the flow of accessing the calling user to the conference room is optimized, the scope of application of the conference access method is expanded, and the efficiency and the success rate of accessing the calling user to the conference room are increased.

BRIEF DESCRIPTION OF THE DRAWINGS

The drawings illustrated here are to provide further understanding of the embodiment of the disclosure and constitute one part of the application, and the exemplary embodiments of the disclosure and the explanations thereof are intended to explain the disclosure, instead of improperly limiting the disclosure. In the drawings.

DETAILED DESCRIPTION OF THE EMBODIMENTS

The disclosure will be described below with reference to the drawings and in combination with the embodiments in detail. It should be noted that, in case of no conflict, the embodiments of the application and features therein can be combined with one another.

The conference access method in the related arts is somewhat limited due to the types of various switched networks. Moreover, a calling user always cannot access a conference successfully due to various reasons of the environment or the calling user themselves. In view of the above, the embodiments of the disclosure provide a conference access method and a conference access apparatus so that the calling user can access a conference by directly calling a conference member. The conference access method and the conference access apparatus are described below through specific embodiments.

Figure 1:
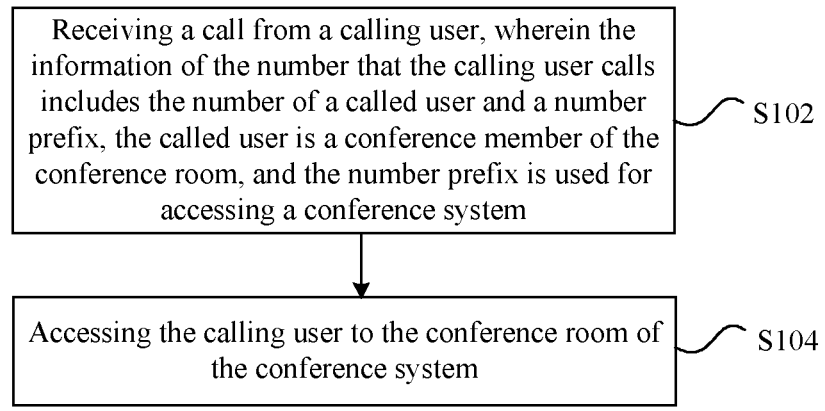
FIG. 1 is a flowchart of a conference access method according to an embodiment of the disclosure.

An embodiment of the disclosure provides a conference access method, which can be implemented at a conference system side. FIG. 1 is a flowchart of a conference access method according to an embodiment of the disclosure. As shown in FIG. 1, the method includes the following steps (Steps S102 to S104).

Step S102: A call from a calling user is received, wherein the information of the number called by the calling user includes the number of a called user and a number prefix, the called user is a conference member of the conference room, and the number prefix is used for accessing a conference system.

Step S104: The calling user is accessed to the conference room of the conference system.

By the method, the calling user directly accesses the conference system through a number prefix called by the calling user and directly accesses the conference room by calling a conference member, so that the problem that the calling user cannot join the conference due to various reasons in the related arts is solved, the flow of accessing the calling user to the conference room is optimized, the scope of application of the conference access method is expanded, and the efficiency and the success rate of accessing the calling user to the conference room are increased.

According to the embodiment, the access to the conference system is implemented through the number prefix called by the calling user so that the difference between various communication network types is shielded, and conference access can be implemented through an intelligent network service only by analyzing and setting the number prefix simply at a switched network side without distinguishing the type of switched networks. The number prefix represents the access number of the conference system, similarly to dialling 17951+the number of the called user, wherein 17951 indicates the use of an IP telephone system. The calling user shows the expectation to access a conference system by the conference access method provided in the embodiment by adding a number prefix.

To improve the security of conference access, after a call from the calling user is received, the conference system may authenticate the identity of the calling user at first and does not access the calling user to the conference room until the authentication is successful. Thereby, the embodiment provides an example implementation way, namely, after the call from the calling user is received, the method may further include that: the calling user is subjected to identity authentication according to the information of the number called by the calling user.

The embodiment provides an example implementation way for how to authenticate the identity of the calling user, namely, the step that the calling user is subjected to identity authentication according to the information of the number called by the calling user includes that: whether the calling user is a conference member of the conference room where the number of the called user is in is determined according to the number of the called user; and when it is determined that the calling user is a conference member of the conference room where the number of the called user is in, the calling user is subjected to identity authentication. In this example implementation way, whether the calling user is a conference member of the conference room can be judged, when the calling user is a conference member of the conference room, in an example embodiment, the calling user may be accessed to the conference room directly.

An example implementation way is described below for how to determine whether the calling user is a conference member of the conference room. The step that whether the calling user is a conference member of the conference room is determined according to the number of the called user includes that: whether the number of the called user is contained in information about online conference members is queried; when the number of the called user is contained in the information about the online conference members, the number of the conference room where the number of the called user is in is determined according to the number of the called user; information about conference members of the conference room is determined according to the number of the conference room; and whether the calling user is a conference member of the conference room is determined according to the information about the conference members of the conference room. In this example implementation way, the accuracy of determining whether the calling user is a conference member of the conference room is increased, and the security of conference access is improved.

After it is determined that the calling user is a conference member, in one aspect, the calling user may be selected to be accessed to the conference room directly. However, in order to improve the security of conference access, for example, when the contents discussed in some conferences are confidential, it is necessary to further authenticate the identity of the calling user. Therefore, the embodiment provides an example implementation way, namely, the calling user is prompted to input a conference password; whether the conference password input by the calling user is correct is judged; and when the conference password input by the calling user is correct, it is determined that identity authentication for the calling user is successful.

After it is determined that the calling user is not a conference member, in order to extend the scope of application of the conference access method and increase the success rate of accessing the calling user to the conference, whether to permit the calling user to access the conference as an observer may be further considered. Therefore, the embodiment of the disclosure further provides an example implementation way, namely, after whether the calling user is a conference member of the conference room is determined, the method may further include that: when the calling user is not a conference member of the conference room, the calling user is taken as an observer of the conference room and the calling user is subjected to identity authentication.

After the calling user is considered to be as a conference observer, the calling user is subjected to identity authentication. Whether to access the calling user to the conference room may be determined by querying the called user and/or a host of the conference about whether to permit the calling user to access the conference room. Thereby, the embodiment provides an example implementation way, namely, the step that the calling user is taken as a conference observer of the conference room and is subjected to identity authentication includes that: the called user is queried about whether to permit the calling user to access the conference room; when the called user permits the calling user to access the conference room, a host of the conference room is queried about whether to permit the calling user to access the conference room; and when the host of the conference room permits the calling user to access the conference room, it is determined that identity authentication for the calling user is successful.

Of course, in this way, whether to permit the calling user to access the conference may be determined by the called user and/or the host of the conference, or, by the called user or other conference members, namely, any one or more conference members may make this determination. Moreover, the determination order is variable; and making the determination by the called user at first and then by the host of the conference room is only an example implementation way. In this way, the function of observing the conference can be implemented for a non-planned conference member, the scope of application of the conference access method can be extended, and a communication operator can run a business fast and in low cost.

Figure 2:
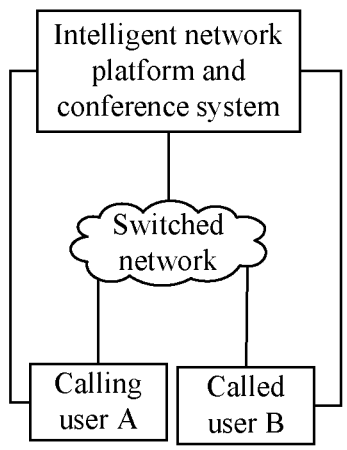
FIG. 2 is a diagram showing the architecture of a system for accessing a calling user to a conference according to an embodiment of the disclosure.

Based on the conference access method described in the embodiment, the architecture of a system for accessing a calling user to a conference is described below. The structure of the system may be implemented by an intelligent network service. When calling a conference member in a teleconference, the calling user may directly access the conference system where the conference member is in. FIG. 2 is a diagram showing the architecture of a system for accessing a calling user to a conference according to an embodiment of the disclosure. As shown in FIG. 2, both calling user A and called user B access a switched network; and an intelligent network platform and a conference system access the switched network and are connected with calling user A and called user B. The information of the number called by calling user A includes a number prefix and the number of the called user B. The number prefix is analyzed at a core switched network side to access the call from calling user A to a conference system. The conference system accesses calling user A to a corresponding conference room for conference after authenticating calling user A by logic processing successfully.

The conference access method is described below more specifically through an example embodiment.

Figure 3:
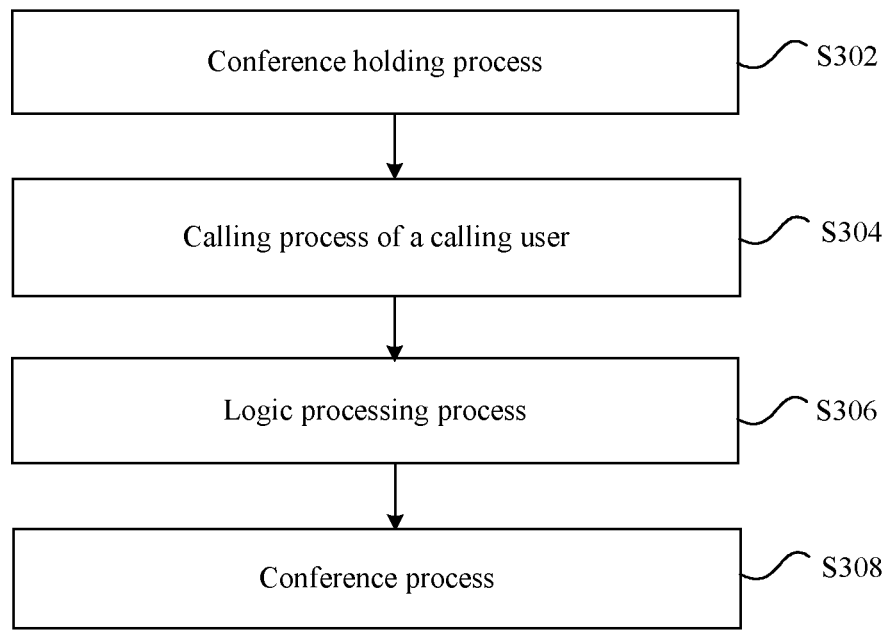
FIG. 3 is a flowchart of a conference access processing method according to an embodiment of the disclosure.

FIG. 3 is a flowchart of a conference access processing method according to an embodiment of the disclosure. As shown in FIG. 3, the method includes the following steps that (Steps S302 to S308).

Step S302: Conference holding process: after it is time to hold a conference, one or more conference members join the conference by dialling an access number initially, or by an outbound call from the system or in other ways; and the system records the information of each conference member, such as being in a conference or the number of the conference room.

Step S304: Calling process of a calling user: the calling user calls a called user by dialling a prefix plus the number of the called user, and accesses to the system by the analysis on the number prefix.

Step S306: Logic processing process: the system queries the information of current conference members by using the number of the called user and acquires the number of the corresponding conference room, and judges whether the calling user is a planned conference member of the conference; when the calling user is a planned conference member of the conference, the calling user is prompted to input a conference password and accesses the conference after the password is verified successfully; when the calling user is not a planned conference member of the conference, the called user identifies the calling user and judges whether to permit the calling user to transfer to the conference room; when the called user permits the calling user to transfer to the conference room, the host of the conference judges whether to permit the calling user to transfer to the conference room; and when the host of the conference also permits the calling user to transfer to the conference room, the calling user is accessed to the conference room.

Step S308: Conference process: after the authentication, the calling user enters the conference room.

Figure 4:
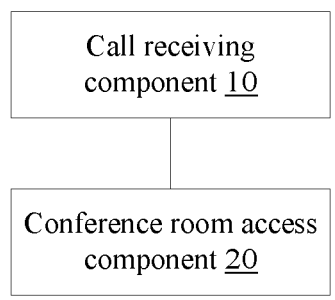
FIG. 4 is a block diagram showing the structure of a conference access apparatus according to an embodiment of the disclosure.

Based on the conference access method described above, an embodiment of the disclosure further describes a conference access apparatus, which may be arranged at a conference system side and configured to implement the embodiment above. FIG. 4 is a block diagram showing the structure of a conference access apparatus according to an embodiment of the disclosure. As shown in FIG. 4, the apparatus includes: a call receiving component 10 and a conference room access component 20. The structure is described below.

The call receiving component 10 is configured to receive a call from a calling user, wherein the information of the number called by the calling user includes the number of a called user and a number prefix, the called user is a conference member of the conference room, and the prefix is used for accessing a conference system.

The conference room access component 20 is coupled with the call receiving component 10 and is configured to access the calling user to the conference room of the conference system.

Through the apparatus, the calling user directly accesses the conference system by a number prefix called by the calling user and directly enters the conference room by calling a conference member, so that the problem that the calling user cannot join the conference due to various reasons in the related arts is solved, the flow of accessing the calling user to the conference room is optimized, the scope of application of the conference access method is expanded, and the efficiency and the success rate of accessing the calling user to the conference room are increased.

Based on the apparatus, the access to the conference system is implemented through the number prefix called by the calling user so that the difference between various communication network types is shielded. Conference access may be implemented through an intelligent network service only by analyzing and setting the number prefix simply at a switched network side without distinguishing the type of switched networks.

Figure 5:
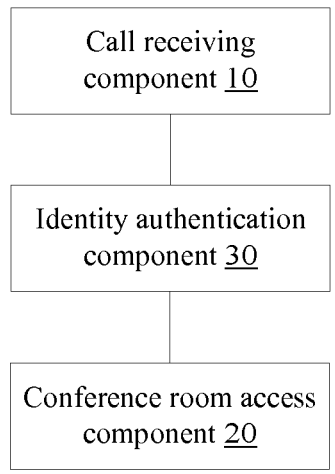
FIG. 5 is a block diagram showing a first specific structure of a conference access apparatus according to an embodiment of the disclosure.

To improve the security of conference access, after the call from the calling user is received, the conference system may authenticate the identity of the calling user at first and does not access the calling user to the conference room until the authentication is successful. Thereby, the embodiment of the disclosure provides an example implementation way. As shown in FIG. 5 which is a block diagram showing a first specific structure of a conference access apparatus, besides each component shown in FIG. 4, the apparatus may further include: an identity authentication component 30, which is coupled with the call receiving component 10 and the conference room access component 20 and is configured to authenticate the identity of the calling user according to the information of the number called by the calling user.

Figure 6:
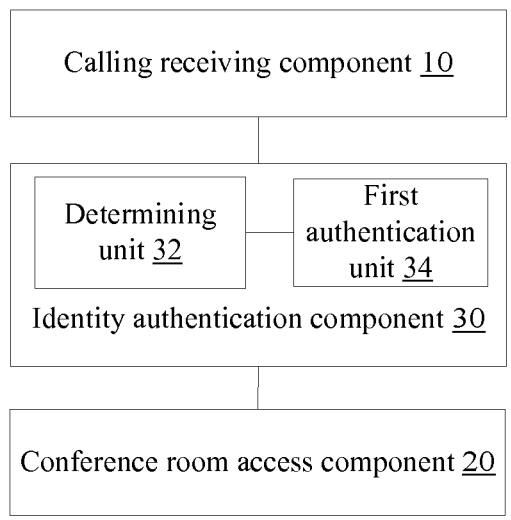
FIG. 6 is a block diagram showing a second specific structure of a conference access apparatus according to an embodiment of the disclosure.

The embodiment provides an example implementation way for how to authenticate the identity of the calling user. As shown in FIG. 6 which is a block diagram showing a second specific structure of a conference access apparatus, besides each component shown in FIG. 5, the identity authentication component 30 may further include a determining unit 32 and a first authentication unit 34. The structure is described below.

The determining unit 32 is configured to determine, according to the number of the called user, whether the calling user is a conference member of the conference room where the number of the called user is in.

The first authentication unit 34 is coupled with the determining unit 32 and is configured to authenticate the identity of the calling user when the determining unit 32 determines that the calling user is a conference member of the conference room.

In the example implementation way, whether the calling user is a conference member of the conference room may be judged, when the calling is a conference member of the conference room, in an example embodiment, the calling user may be accessed to the conference room directly.

An example implementation way is described below for how to determine whether the calling user is a conference member of the conference room by the determining unit 32. The determining unit 32 includes: a query sub-unit, which is configured to query whether the number of the called user is contained in information about online conference members; a first determining sub-unit, which is configured to determine a number of the conference room where the number of the called user is in according to the number of the called user when a query result of the query sub-unit is that the number of the called user is contained in information about online conference members, and determine information about conference members of the conference room according to the number of the conference room; and a second determining sub-unit, which is configured to determine whether the calling user is a conference member of the conference room according to the information about the conference members of the conference room determined by the first determining sub-unit. In the example implementation way, the accuracy of determining whether the calling user is a conference member of the conference room is increased, and the security of conference access is improved.

After it is determined that the calling user is a conference member, in one aspect, the calling user may be selected to be accessed to the conference room directly. However, in order to improve the security of conference access, for example, when the contents discussed in some conferences are confidential, it is necessary to further authenticate the identity of the calling user. Therefore, the embodiment provides an example implementation way, namely, the first authentication unit includes: a password prompt sub-unit, which is configured to prompt the calling user to input a conference password; a password judgement sub-unit, which is configured to judge whether the conference password input by the calling user is correct; and a first authentication success sub-unit, which is configured to determine that identity authentication for the calling user is successful when a judgement result of the password judgement sub-unit is that the password input by the calling user is correct.

After it is determined that the calling user is not a conference member, in order to extend the scope of application of the conference access method and increase the success rate of accessing the calling user to the conference, whether to permit the calling user to access the conference as an observer may be further considered. Therefore, the embodiment of the disclosure further provides an example implementation way, namely, the identity authentication component 30 may further include: a second authentication unit, which is configured to, when the determining unit 32 determines that the calling user is not a conference member of the conference room, take the calling user as a conference observer of the conference room and authenticate the identity of the calling user.

After the calling user is considered to be as a conference observer, the calling user is subjected to identity authentication. Whether to access the calling user to the conference room may be determined by querying the called user and/or the host of the conference about whether to permit the calling user to access the conference room. Thereby, the embodiment provides an example implementation way, namely, the second authentication unit includes: a first query sub-unit, which is configured to query the called user about whether to permit the calling user to access the conference room; a second query sub-unit, which is configured to query the host of the conference room about whether to permit the calling user to access the conference room when a query result of the first query sub-unit is that the called user permits the calling user to access the conference room; and a second authentication success sub-unit, which is configured to determine that identity authentication for the calling user is successful when a query result of the second query sub-unit is that the host permits the calling user to access the conference room.

Of course, in this way, whether to permit the calling user to access the conference may be determined by the called user and/or the host of the conference, or, by the called user or other conference members, namely, any one or more conference members may make this determination. Moreover, the determination order is variable; and making the determination by the called user at first and then by the host of the conference room is only an example implementation way. In this way, the function of observing the conference can be implemented for a non-planned conference member, the scope of application of the conference access method can be extended, and a communication operator can run a business fast and in low cost.

Figure 7:
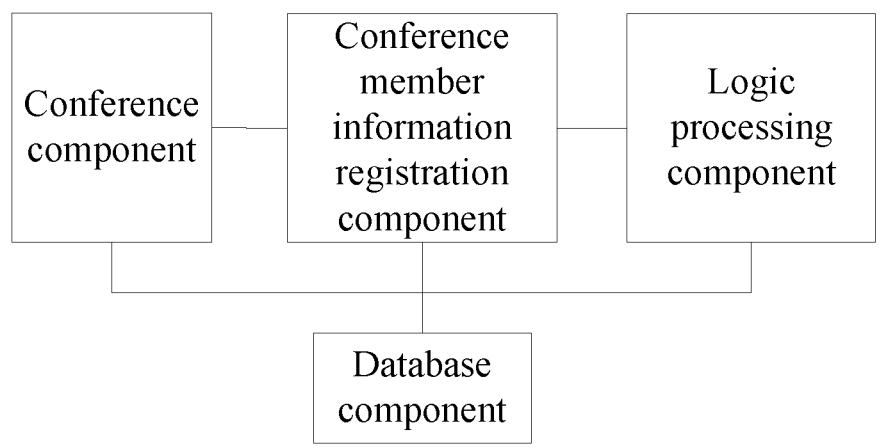
FIG. 7 is a diagram showing the structure of components for directly accessing a conference system by calling a conference member according to an embodiment of the disclosure.

FIG. 7 is a diagram showing the structure of components for directly accessing a conference system by calling a conference member according to an embodiment of the disclosure. As shown in FIG. 7, the conference system includes: a conference component, a conference member information registration component, a logic processing component and a database component. The structure is described below.

The conference component provides a conventional teleconference function, including teleconference server, conference management, conference operator management and the like.

The conference member information registration component is configured to record the information of conference member, such as the number of conference member, the state of conference and the number of conference room, before the call receiving component receives the call from the calling user and after the conference member joins the conference.

The logic processing component has functions equivalent to those of the identity authentication component in the embodiments above. After the calling user calls a service by dialling a prefix plus the number of the called user, the component queries the access number of a corresponding conference room according to the number of the called user, queries the information of corresponding conference members; the called user authenticates the calling number; and the calling user is accessed to a corresponding conference after being authorized and permitted by the host of the conference.

The database component stores the data required by the conference system.

Figure 8:
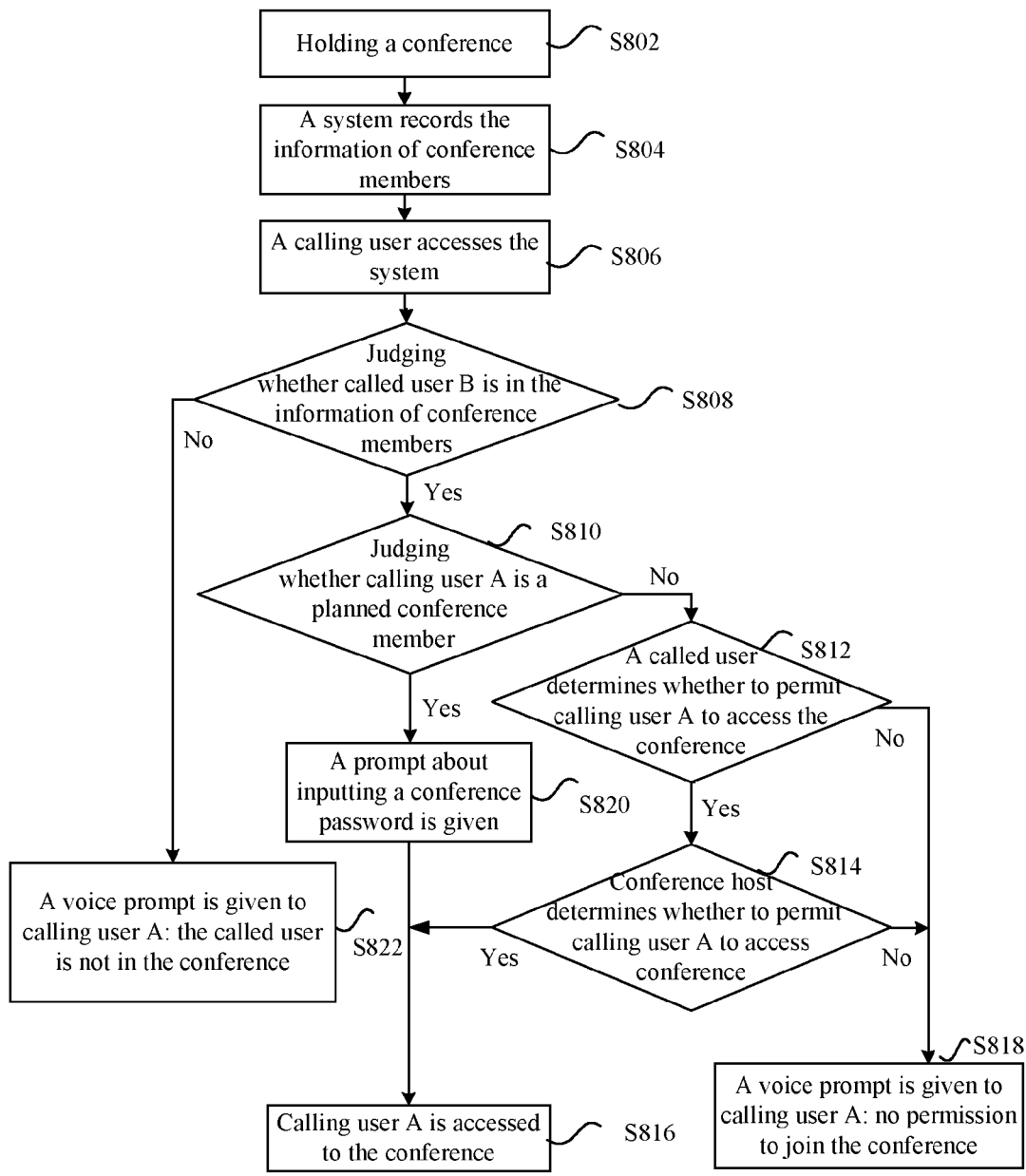
FIG. 8 is a flowchart of a method for implementing conference access through respective components of a conference system according to an embodiment of the disclosure.

Based on each component of the conference system described in the embodiment, the method for implementing conference access by each component of the conference system is described below. FIG. 8 is a flowchart of a method for implementing conference access by respective components of a conference system according to an embodiment of the disclosure. As shown in FIG. 8, the method includes the following steps that (Steps S802 to S822).

Step S802: A conference is held. A conference component provides a conventional teleconference function. After it is time for a predetermined conference, one or more conference members access the conference by an outbound call from a system or an initial dialling or in other ways; and a conference is held normally.

Step S804: The system records the information of conference members. After the conference is held, the conference member information registration component records the information of conference members, including whether each conference member is in the conference, the number of the corresponding conference room and the like.

Step S806: A calling user accesses the system. Calling user A calls a prefix plus the number of the called user B, and a switched side analyzes the prefix number and accesses it to the system.

Step S808: Whether called user B is in the information of conference members is judged. After the system receives the call, the prefix number is removed, and the information of conference members is queried based on the number of the called user B. When called user B is an online conference member in the system, the number of the corresponding conference room is acquired and Step S810 is executed; otherwise, Step S822 is executed.

Step S810: Whether calling user A is a planned conference member is judged; a conference member list is queried; when calling user A is a planned conference member, Step S820 is executed; otherwise, Step S812 is executed.

Step S812: A called user determines whether to permit calling user A to access the conference. When calling user A is not in the conference member list and hopes to be an observer, calling user A is authenticated by calling user B at first; and the system prompts called user B by voice, e.g.: user A makes a call and hopes to join the conference, whether to permit user A to join the conference, press 1 for permission and press 2 for refusal. When called user B permits user A to join the conference, Step S814 is executed; otherwise, Step S818 is executed.

Step S814: The host of the conference determines whether to permit calling user A to access the conference; after called user B identifies calling user A successfully, the system prompts the host of the conference by voice or a WEB interface, e.g.: user A calls user B and hopes to observe the conference, whether to permit user A, press 1 for permission and press 2 for refusal. When the host of the conference permits user A to observe the conference, Step S816 is executed; otherwise, Step S818 is executed.

Step S816: Calling user A is accessed to the conference. The flow is ended.

Step S818: A voice prompt is given to calling user A, e.g.: no permission to join the conference. The flow is ended.

Step S820: A prompt about inputting a conference password is given. After the password is authenticated successfully, Step S816 is executed.

Step S822: A voice prompt is given to calling user A, e.g.: the user called thereby is not in the conference. The flow is ended.

It can be seen from the above that the calling user accesses the conference room by directly calling the conference member in the embodiment. Through the embodiments of the disclosure, flexible networking configuration is implemented, the flow of accessing the calling user to the conference room is optimized, the scope of application of the conference access method is expanded, and the efficiency and the success rate of accessing the calling user to the conference room are increased.

Obviously, those skilled in the art shall understand that the components or steps of the disclosure may be implemented by general computing apparatus and centralized in a single computing apparatus or distributed in a network consisting of multiple computing apparatus. Optionally, the components or steps may be implemented by program codes executable by the computing apparatus, so that they may be stored in a storage apparatus and executed by the computing apparatus, and, in some cases, the steps can be executed in a sequence different from the illustrated or described sequence, or they are respectively made into the integrated circuit components or many of them are made into a single integrated circuit component. Thereby, the embodiments of the disclosure are not limited to any specific combination of hardware and software.

The above are only the example embodiments of the disclosure and not intended to limit the disclosure. For those skilled in the art, various modifications and changes can be made in the disclosure. Any modifications, equivalent replacements, improvements and the like within the principle of the disclosure shall fall within the scope of protection defined by the claims of the disclosure.

INDUSTRIAL APPLICABILITY

The technical solution provided by the embodiments of the disclosure can be applied to the field of teleconference to solve the problem that the calling user cannot join the conference due to various reasons in the related arts, optimize the flow of accessing the calling user to the conference room, expand the scope of application of the conference access method, and increase the efficiency and the success rate of accessing the calling user to the conference room.

What is claimed is:

1. A conference access method, comprising:
   receiving a call from a calling user, wherein information of a number called by the calling user comprises a telephone number of a called user and a number prefix of the telephone number of the called user, the called user is a conference member of a conference room, and the number prefix is used for accessing a conference system; and
   removing the number prefix from the information of the number called by the calling user after receiving the call;
   querying information of conference members based on the telephone number of the called user;
   acquiring a number of the conference room when the called user is an online conference member in the system;
   accessing the calling user to the conference room of the conference system.

2. The method according to claim 1, wherein after the call from the calling user is received, the method further comprises:
   authenticating identity of the calling user according to the information of the number called by the calling user.

3. The method according to claim 2, wherein authenticating the identity of the calling user according to the information of the number called by the calling user comprises:
   determining, according to the telephone number of the called user, whether the calling user is a conference member of the conference room where the telephone number of the called user is in; and
   when it is determined that the calling user is a conference member of the conference room where the telephone number of the called user is in, authenticating the identity of the calling user.

4. The method according to claim 3, wherein determining, according to the telephone number of the called user, whether the calling user is a conference member of the conference room where the telephone number of the called user is in comprises:
   querying whether the telephone number of the called user is contained in information about online conference members;
   when the telephone number of the called user is contained in the information about the online conference members, determining a number of the conference room where the telephone number of the called user is in according to the telephone number of the called user;
   determining information about conference members of the conference room according to the number of the conference room; and
   determining whether the calling user is a conference member of the conference room according to the information about the conference members of the conference room.

5. The method according to claim 3, wherein authenticating the identity of the calling user comprises:
   prompting the calling user to input a conference password;

judging whether the conference password input by the calling user is correct; and when the conference password input by the calling user is correct, determining that identity authentication for the calling user is successful.

6. The method according to claim 3, wherein after determining whether the calling user is a conference member of the conference room, the method further comprises:

when the calling user is not a conference member of the conference room, taking the calling user as a conference observer of the conference room and authenticating the identity of the calling user.

7. The method according to claim 6, wherein taking the calling user as the conference observer of the conference room and authenticating the identity of the calling user comprises:

querying the called user about whether to permit the calling user to access the conference room;

when the called user permits the calling user to access the conference room, querying a host of the conference room about whether to permit the calling user to access the conference room; and when the host of the conference room permits the calling user to access the conference room, determining that identity authentication for the calling user is successful.

8. A conference access apparatus, comprising:

a call receiving component, which is configured to receive a call from a calling user, wherein information of a number called by the calling user comprises a telephone number of a called user and a number prefix of the telephone number of the called user, the called user is a conference member of a conference room, and the number prefix is used for accessing a conference system; and a conference room access component, which is configured to access the calling user to the conference room of the conference system;

wherein the conference access apparatus, is further configured to remove the number prefix from the information of the number called by the calling user after receiving the call; query information of conference members based on the telephone number of the called user; acquire a number of the conference room when the called user is an online conference member in the system.

9. The apparatus according to claim 8, further comprising:

an identity authentication component, which is configured to authenticate identity of the calling user according to the information of the number called by the calling user.

10. The apparatus according to claim 9, wherein the identity authentication component comprises:

a determining unit, which is configured to determine, according to the telephone number of the called user, whether the calling user is a conference member of the conference room where the telephone number of the called user is in; and a first authentication unit, which is configured to authenticate the identity of the calling user when the determining unit determines that the calling user is a conference member of the conference room where the telephone number of the called user is in.

11. The apparatus according to claim 10, wherein the determining unit comprises:

a query sub-unit, which is configured to query whether the telephone number of the called user is contained in information about online conference members;

a first determining sub-unit, which is configured to, when a query result of the query sub-unit is that the telephone number of the called user is contained in the information about online conference members, determine a number of the conference room where the telephone number of the called user is in according to the telephone number of the called user, and determine information about conference members of the conference room according to the number of conference room; and a second determining sub-unit, which is configured to determine whether the calling user is a conference member of the conference room according to the information about the conference members of the conference room determined by the first determining sub-unit.

12. The apparatus according to claim 10, wherein the first authentication unit comprises:

a password prompt sub-unit, which is configured to prompt the calling user to input a conference password;

a password judgement sub-unit, which is configured to judge whether the conference password input by the calling user is correct; and a first authentication success sub-unit, which is configured to determine that identity authentication for the calling user is successful when a judgement result of the password judgement sub-unit is that the password input by the calling user is correct.

13. The apparatus according to claim 10, wherein the identity authentication component further comprises:

a second authentication unit, which is configured to, when the determining unit determines that the calling user is not a conference member of the conference room, take the calling user as a conference observer of the conference room and authenticate the identity of the calling user.

14. The apparatus according to claim 13, wherein the second authentication unit comprises:

a first query sub-unit, which is configured to query the called user about whether to permit the calling user to access the conference room;

a second query sub-unit, which is configured to query a host of the conference room about whether to permit the calling user to access the conference room when a query result of the first query sub-unit is that the called user permits the calling user to access the conference room; and a second authentication success sub-unit, which is configured to determine that identity authentication for the calling user is successful when a query result of the second query sub-unit is that the host permits the calling user to access the conference room.

* * * * *